United States Patent [19]

Mann

[11] Patent Number: 4,483,417
[45] Date of Patent: Nov. 20, 1984

[54] AIRLINE LUBRICATOR

[75] Inventor: David O. Mann, Marshall, Mich.

[73] Assignee: La-Man Corporation, Hamilton, Ind.

[21] Appl. No.: 402,589

[22] Filed: Jul. 28, 1982

[51] Int. Cl.³ .......................... F16N 7/32; F16N 11/10
[52] U.S. Cl. ..................................... 184/55.2; 184/6.26
[58] Field of Search .................. 184/6.26, 50 A, 55 R, 184/55 A, 56 R, 56 A, 59, 55.1, 55.2; 239/322, 323, 398, 410, 411, 416.5; 222/386.5, 422, 630, 637; 138/30; 123/449, 590

[56] References Cited

U.S. PATENT DOCUMENTS

| 1,984,422 | 12/1934 | Neil | 184/55 A |
|---|---|---|---|
| 2,430,361 | 11/1947 | O'Farrell et al. | 184/55 A |
| 2,687,187 | 8/1954 | Lake | 184/55 A |
| 2,897,919 | 8/1959 | Deliner | 184/55 A |
| 2,945,560 | 7/1960 | Malec | 184/55 A |
| 3,040,835 | 6/1962 | Ahnert | 184/55 A |
| 4,174,767 | 11/1979 | Kramer | 184/55 A |

Primary Examiner—David H. Brown
Assistant Examiner—John E. Griffiths, Jr.
Attorney, Agent, or Firm—Barnes, Kisselle, Raisch, Choate, Whittemore & Hulbert

[57] ABSTRACT

An airline lubricator in which a diaphragm is disposed in a closed annular chamber surrounding an axial air passage to divide the chamber into an air pressure chamber and a lubricant reservoir. The air pressure chamber is coupled by an angulated pressure tube to the primary air passage adjacent the lubricator inlet. A metering tube and adjustable screw arrangement at the output of the reservoir control the amount of lubricant fed to the primary air passage as a function pressure drop across the primary air path. A ball-type check valve including an adjustable valve seat is disposed across the primary air path in opposition to the metering tube for preventing passage of lubricant in the absence of primary air flow.

11 Claims, 4 Drawing Figures

AIRLINE LUBRICATOR

The present invention is directed to airline lubricators, and more particularly to a device for automatically injecting lubricant into a compressed airline fed to a pneumatic tool or the like.

A general object of the present invention is to provide an airline lubricator of simple construction which is economical to manufacture and which provides reliable service over an extended operating lifetime.

A more specific object of the invention is to provide an airline lubricator of the described type which is adapted to be coupled to an airline in any desired orientation, and which feeds lubricant to the airline only when air is flowing therein.

Yet another object of the invention is to provide an airline lubricator of the described type wherein the amount of lubricant fed to the airline may be readily adjusted.

The invention, together with additional objects, features and advantages thereof, will be best understood from the following description, the appended claims and the accompanying drawings in which:

Figure 1:
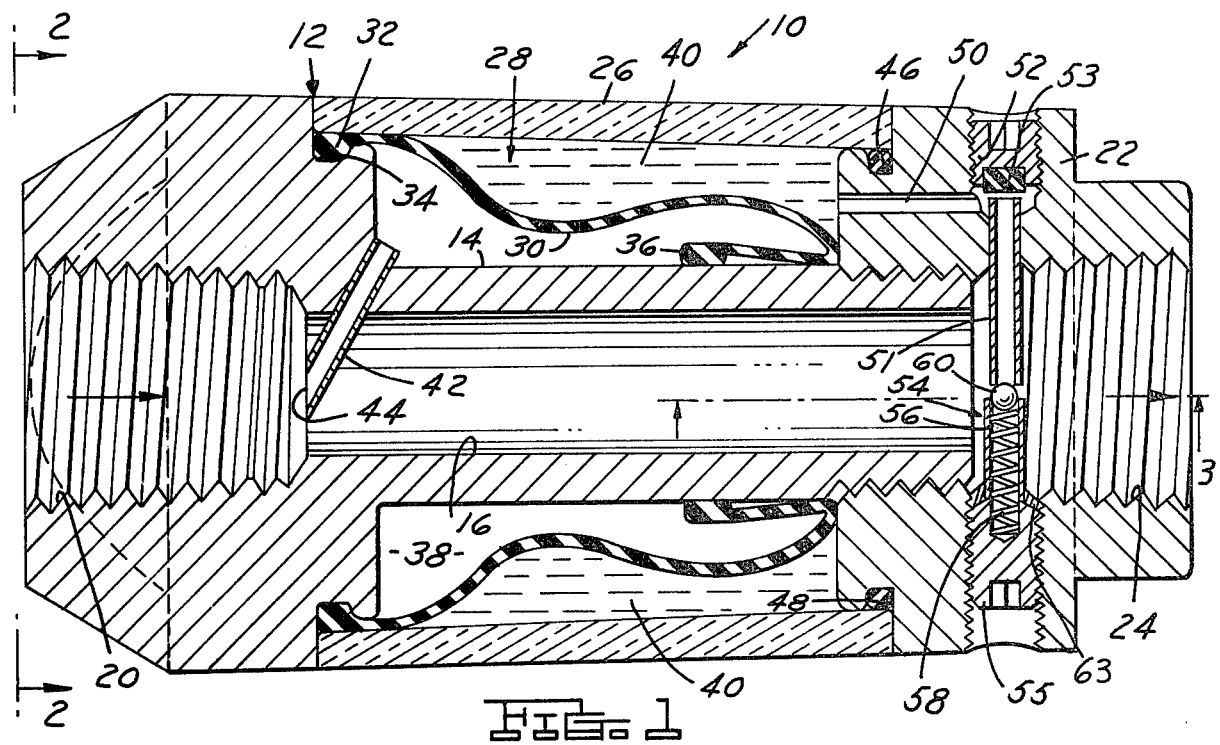
FIG. 1 is an elevational bisectional view of a lubricator in accordance with the invention taken in an axial plane, as along the line 1—1 in FIG. 2.
Figure 2:
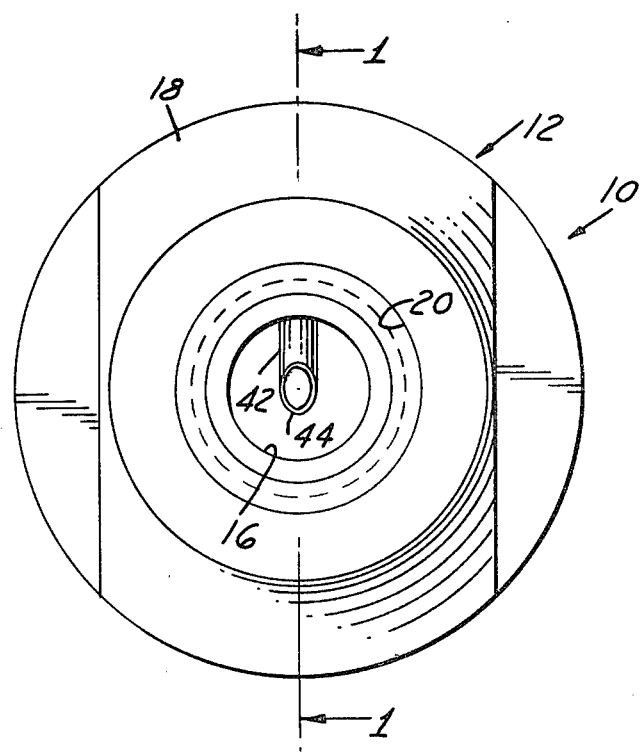
FIG. 2 is an elevational view of the inlet end of the lubricator of FIG. 1.

The drawings illustrate a presently preferred embodiment 10 of an airline lubricator in accordance with the invention as comprising an enclosure or casing 12 including a hollow cylindrical tube or pipe 14 defining a central air passage 16 of uniform diameter extending along the tube axis. An inlet head 18 is integral with tube 14 at one end thereof, and includes a tapered internally threaded opening 20 aligned with passage 16 for defining an air inlet. An outlet head 22 is threaded onto the opposing end of tube 14 and includes an internally threaded tapered opening 24 aligned with passage 16 for defining an air outlet. An airline may be connected to openings 20,24 using suitable fittings (not shown).

A cylindrical sleeve or casing wall 26 is captured between heads 18,22 and cooperates therewith to define an annular chamber 28 coaxially surrounding air passage tube 14 intermediate the air passage ends. An annular diaphragm 30 of resilient elastomeric oil-resistant construction has a circumferentially continuous bead 32 at one end captured in sealing compression by wall 26 against a radially facing shoulder 34 on head 18. A second circumferentially continuous bead 36 at the opposing end of diaphragm 30 is elastically received in tension over tube 14 adjacent head 22. In its relaxed state (not shown in the drawings), diaphragm 30 extends from bead 32 along the inner surfaces of wall 26 and head 22, and along tube 14 to bead 36. Thus, diaphragm 30 effectively divides annular chamber 28 into an annular air pressure chamber 38 adjacent inlet head 18 and an annular oil reservoir 40 adjacent outlet head 22.

An air pressure tube 42 extends at an angle through tube 14 at the juncture of the latter with inlet head 18. The end 44 of tube 42 within air passage 16 is disposed at about the axis thereof and is cut or formed at an angle so as to be oriented in a radial plane facing in the direction of inlet opening 20. Thus, tube 42 feeds inlet air pressure to chamber 38. An annular resilient O-ring 46 is sealingly captured in compression by wall 26 against a radially facing shoulder 48 on head 22. A lubricant passage 50 extends within head 22 from reservoir 40 parallel to the axis of air passage 16. A metering tube 51 is press-fitted into head 22 and extends in the radial direction from the reservoir-remote end of passage 50 into air passage 16, terminating adjacent the air passage central axis. A set screw 52 is threaded into head 22 in axial alignment with tube 51 and has an insert 53 at the inner end thereof which cooperates with the opposing radially outer flat end of tube 51 for varying the effective opening size of the metering tube input end, and thereby varying the amount of lubricant fed to air passage 16 for a given drop in pressure through air passage 16.

Figure 4:
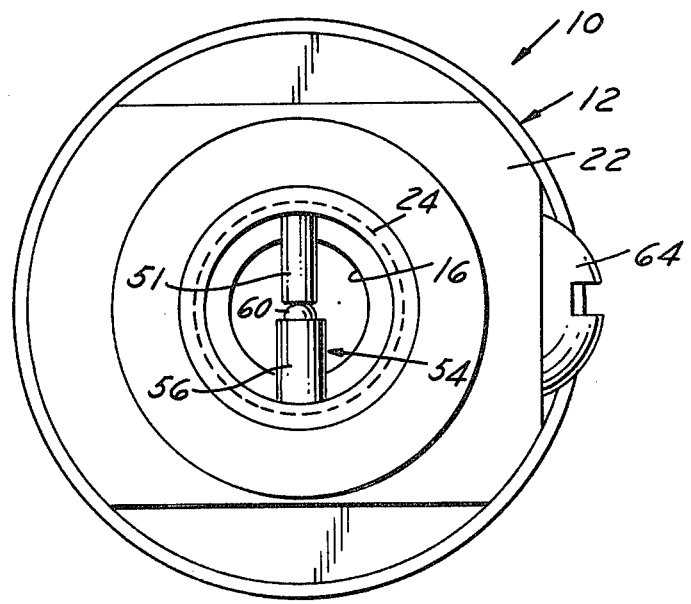
FIG. 4 is an elevational view of the outlet end of the lubricator.

A check valve 54 is carried by head 22 for preventing flow of lubricant from metering tube 51 into passage 16 in the absence of air flow in the latter. Check valve 54 comprises a head 55 threadably received in enclosure head 22, and a hollow sleeve or shank 56 extending integrally and coaxially therefrom in diametrically opposed alignment with metering tube 51. A coil spring 58 is carried internally of sleeve 56 and biases a valve element ball 60 against the opposing flat end of metering tube 51. As best seen in FIG. 4, ball 60 is disposed at about the central axis of air passage 16. The outside diameter of ball 60 is less than the inside diameter of sleeve 56. A ring 63 surrounds sleeve 56 and engages the opposing threads in head 22 for holding head 55 in desired set position.

Figure 3:
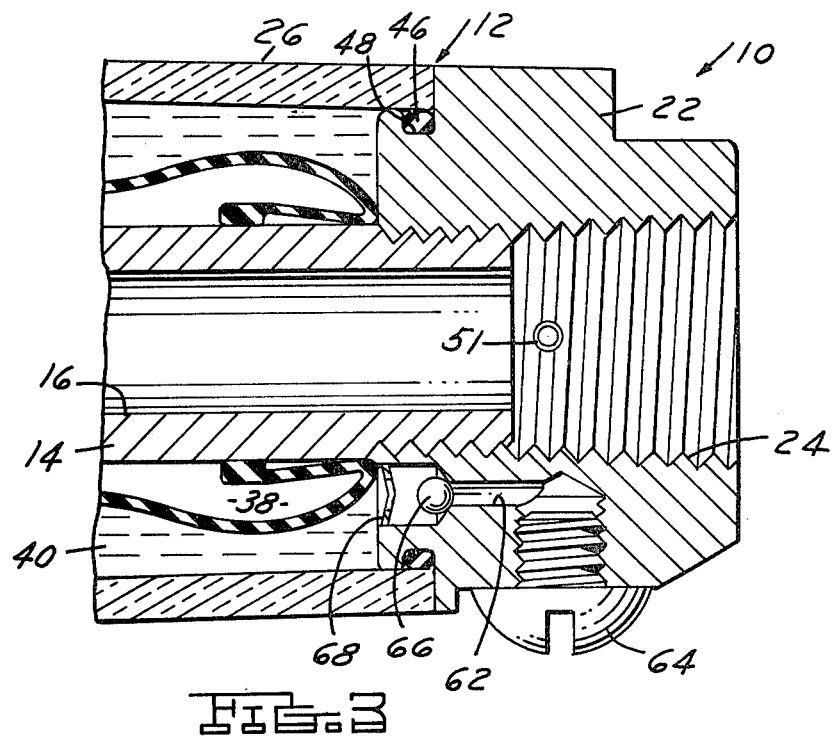
FIG. 3 is a fragmentary sectional view taken along the line 3—3 in FIG. 1.

FIG. 3 illustrates the reservoir fill mechanism as comprising a fill passage 62 extending within head 22 axially and then radially from reservoir 40. A screw 64 closes the reservoir-remote end of passage 62. A ball 66 is captured by a retaining clip 68 within passage 62 adjacent reservoir 40 to prevent back-flow of lubricant under pressure to screw 64.

In operation, in the absence of air flow in passage 16, metering tube 51 is closed by valve ball 60 and passage of lubricant to the airline is blocked in all orientations of lubricator 10. As air flow begins within passage 16, an increase in air pressure with chamber 38 urges lubricant from within reservoir 40 through passage 50 and tube 51 against ball 60. When lubricant pressure is sufficient to overcome spring 58, ball 60 will be urged away from metering tube 51 and lubricant will be aspirated into the flowing air. Transparent wall 26 permits observation of lubricant reservoir 40, which may be refilled through passage 62 (FIG. 3) when empty. It will be appreciated that screw 52 and head 55 are accessible from externally of enclosure 12 and may be readily adjusted during operation of the lubricator. Likewise, ball valve 66 permits removal of screw 64 and filling of the reservoir without shutting down the airline and/or removing lubricator 10 therefrom. Screw 52 adjusts the amount of lubricant fed to metering tube 51 as a function of air pressure, and head 55 adjusts the effective spring pressure on valve ball 60.

I claim:

1. An airline lubricator comprising an enclosure including a central continuous air passage of uniform diameter extending along an enclosure axis from an inlet end of said enclosure to an outlet end, and means defining an annular chamber surrounding said air passage intermediate said ends, a diaphragm of flexible resilient construction disposed in said annular chamber and dividing said annular chamber into a lubricant reservoir adjacent said outlet end and an air pressure chamber adjacent said inlet end, means adjacent said inlet end for directing air in said air passage into said air pressure chamber, metering means including a lubricant passage spaced radially from said air passage extending axially into said enclosure from said reservoir and a metering tube extending radially from the reservoir-remote end of said lubricant passage into said air passage, and check valve means carried by said enclosure diametrically opposite said metering tube and including a valve element, a sleeve extending radially into said air passage to position said valve element adjacent said metering tube and a valve spring disposed within said sleeve and biasing said valve element against said metering tube, spring pressure on said valve element against said metering tube being overcome solely by pressure of lubricant in said metering tube from said reservoir.

2. The airline lubricator set forth in claim 1 wherein said metering tube has a flat end surface facing said check valve means, and wherein said valve element comprises a ball seated against said flat end surface by said spring.

3. The airline lubricator set forth in claim 2 wherein said check valve means further comprises means defining a seat for said spring threadably received in said enclosure for adjusting spring bias against said ball.

4. The airline lubricator set forth in claim 3 wherein said sleeve and said means defining said spring seat are of integral construction.

5. The airline lubricator set forth in claim 3 wherein said lubricant passage is disposed adjacent to an outside surface of said enclosure, and wherein said metering means includes means threadably received in said enclosure at said reservoir-remote end of said lubricant passage for adjusting effective cross sectional area of said metering means.

6. The airline lubricator set forth in claim 1 wherein said means adjacent said inlet end comprises a tube carried by said enclosure and extending at an angle from adjacent said inlet end to said pressure chamber.

7. An airline lubricator comprising an enclosure including an inlet head containing an air inlet opening and a hollow cylindrical tube, an outlet head spaced from said inlet head and containing an air outlet opening, said hollow cylindrical tube extending axially to said outlet head and having an internal bore connecting said inlet opening to said outlet opening to define an air passage, and wall means extending between said inlet and outlet heads and radially spaced from said tube to define an annular chamber bounded by axially opposed surfaces of said heads and radially opposed surfaces of said tube and said wall means, a flexible diaphragm disposed in said annular chamber and dividing said chamber into a lubricant reservoir continuous with the chamber-defining surface of said outlet head and an air pressure chamber contiguous with the chamber-defining surface of said inlet head, means carried by said inlet head connecting said air passage at said inlet opening to said air pressure chamber, lubricant metering means carried by said outlet head including a lubricant outlet passage parallel to and spaced radially from said air passage extending from said lubricant reservoir at said chamber-defining surface of said outlet head, metering tube means extending radially from the reservoir-remote end of said lubricant passage into said air passage within said outlet head, a set screw threadably received in said outlet head at the juncture of said lubricant passage and metering tube means in alignment with said metering tube means and adjustable from externally of said outlet head for selectively varying cross sectional area of said lubricant passage at said juncture, and a check valve comprising means threadably received in said outlet head in diametrically opposed alignment with said metering tube means across said air passage, a sleeve extending into said passage from said threadably-received means in opposition to said metering tube means, a ball slidably received within said sleeve, and a spring disposed within said sleeve and urging said ball against said metering tube means.

8. The airline lubricator set forth in claim 7 or 1 wherein said means defining said annular chamber includes a wall surrounding said annular chamber which is constructed of transparent material for permitting visual observation of said reservoir.

9. The airline lubricator set forth in claim 7 wherein said tube is integral with said inlet head, and wherein said outlet head is removably received over an end of said tube remote from said inlet head, said inlet opening, outlet opening and passage being coaxial.

10. The airline lubricator set forth in claim 7 or 1 further comprising means carried by said enclosure for filling said reservoir with lubricant.

11. The airline lubricator set forth in claim 10 wherein said means for filling said reservoir comprises a fill passage extending from said reservoir to an outer surface of said enclosure, closure means adapted to be removably received within said fill passage at said outer surface and check valve means disposed at an end of said fill passage adjacent said reservoir for preventing back-flow by lubricant to said closure means.

* * * * *